US009357296B2

(12) United States Patent
Josefsson et al.

(10) Patent No.: US 9,357,296 B2
(45) Date of Patent: May 31, 2016

(54) SWITCHABLE ATTENUATION CIRCUIT FOR MEMS MICROPHONE SYSTEMS

(71) Applicant: Invensense, Inc., San Jose, CA (US)

(72) Inventors: Olafur Mar Josefsson, Hafnarfjordur (IS); Jens Gaarde Henriksen, Charlottenlund (DK)

(73) Assignee: INVENSENSE, INC., San Jose, CA (US)

( * ) Notice: Subject to any disclaimer, the term of this patent is extended or adjusted under 35 U.S.C. 154(b) by 201 days.

(21) Appl. No.: 14/099,078

(22) Filed: Dec. 6, 2013

(65) Prior Publication Data

US 2014/0093102 A1 Apr. 3, 2014

Related U.S. Application Data

(62) Division of application No. 12/784,143, filed on May 20, 2010, now Pat. No. 8,625,809.

(51) Int. Cl.

| | |
|---|---|
| ***H04B 15/00*** | (2006.01) |
| ***H04R 3/00*** | (2006.01) |
| ***H04R 3/06*** | (2006.01) |
| *H04R 19/00* | (2006.01) |
| *H04R 19/01* | (2006.01) |
| *H04R 19/04* | (2006.01) |

(52) U.S. Cl.
CPC .. *H04R 3/00* (2013.01); *H04R 3/06* (2013.01); *H04R 19/005* (2013.01); *H04R 19/016* (2013.01); *H04R 19/04* (2013.01)

(58) Field of Classification Search
CPC ....... H03G 3/20; H03G 5/165; H03G 3/3005; H03G 9/025; H03G 3/32
USPC ......... 381/94.8, 101, 102, 103, 106, 107, 108
See application file for complete search history.

(56) References Cited

U.S. PATENT DOCUMENTS

| | | | | |
|---|---|---|---|---|
| 5,016,515 A * | 5/1991 | Scott | G10G 7/02 | 84/454 |
| 5,734,725 A | 3/1998 | Pritchard | | |
| 6,108,426 A * | 8/2000 | Stortz | G06F 1/3203 | 381/124 |
| 6,266,423 B1 * | 7/2001 | Werrbach | H03G 11/04 | 381/106 |

(Continued)

FOREIGN PATENT DOCUMENTS

| | | |
|---|---|---|
| WO | 0178446 | 10/2001 |
| WO | 02073792 | 9/2002 |

*Primary Examiner* — Alexander Jamal
(74) *Attorney, Agent, or Firm* — Maryam Imam; IPxLAW Group LLP

(57) ABSTRACT

A switch control circuit monitors a signal produced by a MEMS or other capacitor microphone. When a criterion is met, for example when the amplitude of the monitored signal exceeds a threshold or the monitored signal has been clipped or analysis of the monitored signal indicates clipping is imminent or likely, the switch control circuit operates one or more switches so as to selectively connect one or more capacitors to a signal line from the microphone, i.e., so as to connect a selected capacitance to the signal line to attenuate the signal from the microphone and, therefore, avoid clipping. The switches may be MOSFET, MEMS or other types of switches co-located with the microphone in a common semiconductor package. Similarly, the capacitors, a circuit that processes the signals from the microphone and/or the switch control circuit may be co-located with the microphone in a common semiconductor package.

42 Claims, 6 Drawing Sheets

(56) References Cited

U.S. PATENT DOCUMENTS

| | | | |
|---|---|---|---|
| 6,288,606 | B1 | 9/2001 | Ekman et al. |
| 6,522,752 | B1 | 2/2003 | Smith |
| 7,142,037 | B2 | 11/2006 | Josefsson |
| 2009/0003629 | A1 | 1/2009 | Shajaan et al. |
| 2009/0052696 | A1 | 2/2009 | Iwamatsu |
| 2009/0316935 | A1* | 12/2009 | Furst ..................... H03F 1/3211 381/111 |
| 2010/0266145 | A1 | 10/2010 | Aimo Suvanto |
| 2011/0026739 | A1 | 2/2011 | Thomsen et al. |
| 2011/0029109 | A1 | 2/2011 | Thomsen et al. |
| 2011/0110536 | A1* | 5/2011 | Hovesten ............. H04R 29/004 381/111 |
| 2012/0121106 | A1 | 5/2012 | Henriksen |

* cited by examiner

SWITCHABLE ATTENUATION CIRCUIT FOR MEMS MICROPHONE SYSTEMS

CROSS REFERENCE TO RELATED APPLICATIONS

This application is a divisional of U.S. patent application Ser. No. 12/784,143, filed on May 20, 2010, by Josefsson et al., and entitled "Switchable Attenuation Circuit For MEMS Microphone Systems", which claims the benefit of U.S. Provisional Patent Application No. 61/179,757, filed May 20, 2009, titled "Switchable Input Capacitor for MEMS Systems," the entire contents of which are hereby incorporated by reference herein, for all purposes.

TECHNICAL FIELD

The present invention relates to MEMS (microelectromechanical system) systems, and more particularly to expanding the input range of a MEMS sensor or microphone.

BACKGROUND ART

Microelectromechanical systems (MEMS) microphones are commonly used in mobile telephones and other consumer electronic devices, embedded systems and other devices. A MEMS microphone typically includes a conductive micromachined diaphragm that vibrates in response to an acoustic signal. The microphone also includes a fixed conductive plate parallel to, and spaced apart from, the diaphragm. The diaphragm and the conductive plate collectively form a capacitor, and an electrical charge is placed on the capacitor, typically by an associated circuit. The capacitance of the capacitor varies rapidly as the distance between the diaphragm and the plate varies due to the vibration of the diaphragm. Typically, the charge on the capacitor remains essentially constant during these vibrations, so the voltage across the capacitor varies as the capacitance varies. The varying voltage may be used to drive a circuit, such as an amplifier or an analog-to-digital converter, to which the MEMS microphone is connected. A MEMS microphone connected to a circuit is referred to herein as a "MEMS microphone system" or a "MEMS system."

MEMS microphone dies are often electrically connected to application-specific integrated circuits (ASICs) to process the electrical signals from the microphones. A MEMS microphone die and its corresponding ASIC are often housed in a common integrated circuit package to keep leads between the microphone and the ASIC as short as possible, such as to avoid parasitic capacitance caused by long leads.

When used in consumer electronics devices and other contexts, MEMS microphone systems may be subjected to widely varying amplitudes of acoustic signals. For example, a mobile telephone used outdoors under windy conditions or in a subway station subjects the MEMS microphone to very loud acoustic signals. Even under quite ambient conditions, a user may hold a microphone too close to the user's mouth or speak in too loud a voice for the MEMS microphone system. Under these circumstances, the diaphragm may reach its absolute displacement limit, and the resulting signal may therefore be "clipped," causing undesirable distortion. Even if the diaphragm does not reach its absolute displacement limit, the ASIC or other processing circuitry may not be able to handle the peaks of the electrical signal from the MEMS microphone, and the signal may be clipped. Clipping can cause a loss of signal contents. For example, if a speech signal is clipped, the output signal waveform becomes flat and no longer varies with the human speech. Thus, during the clipped portion of each cycle, the signal conveys no intelligible content.

SUMMARY OF EMBODIMENTS

An embodiment of the present invention provides a microphone system configured to avoid or reduce clipping. The microphone system includes a movable structure and an electrode, such as a MEMS or other capacitor microphone. The movable structure is movable in response to an acoustic signal. The movable structure and the electrode establish a capacitance that varies with the acoustic signal to which the movable structure is subjected. Movement of the movable structure produces an electrical signal. The microphone system also includes a circuit for processing the signal. A switch selectively operates to connect a capacitance to a conductive line carrying the signal, so as to attenuate the signal before it is processed by the circuit.

The capacitance may include one or more capacitors connected to the switch. Each capacitor may have a different capacitance.

The switch may include a plurality of switches connected to the plurality of capacitors, such that the capacitance connected to the line depends on the states of the switches. The switches may be implemented with MOSFETs, MEMS switches or other suitable devices or circuits.

A switch control circuit may activate the switch(es) after the signal or a signal derived from the signal (such as a signal generated by a down-stream amplifier or analog-to-digital converter) meets a criterion. The criterion may be met when the signal or the signal derived from the signal exceeds a threshold value or a value less than necessary for clipping or is clipped.

The movable structure, the switch and (optionally) the switch control circuit may be disposed within a common integrated circuit package. The switch control circuit may be entirely or partially disposed external to the common integrated circuit package.

The movable structure and the switch may be disposed in a common integrated circuit die or on different dies.

The switch control circuit may be configured to activate the switch in timed relation to a zero crossing of the signal or the signal derived from the signal.

Another embodiment of the present invention provides a method for attenuating a signal from a capacitor microphone. The method involves detecting if the amplitude of a signal from the capacitor microphone meets a criterion. In response to detecting the amplitude meeting the criterion, a capacitance is automatically connected to a line carrying a signal from the capacitor microphone.

Connecting the capacitance to the line may involve activating a switch. The switch may be disposed within an integrated circuit package that houses the capacitor microphone.

A plurality of capacitors may be selectively connectable to the line via a plurality of switches, such that the capacitance connected to the line depends on the states of the switches. Connecting the capacitance to the line may include activating at least one of the plurality of switches, based on an attribute of the signal. The attribute may involve the amplitude of the signal.

The plurality of switches and the plurality of capacitors may be disposed within an integrated circuit package that houses the capacitor microphone.

The criterion may be met when the amplitude of the signal from the capacitor microphone exceeds a threshold, or when the signal from the capacitor microphone is clipped or when the signal from the capacitor microphone reaches a value less than necessary for clipping.

Yet another embodiment of the present invention provides a microphone system that includes a movable structure and an electrode, such as a MEMS or other capacitor microphone. The movable structure is movable in response to an acoustic signal. The movable structure and the electrode establish a capacitance that varies with the acoustic signal. Movement of the movable structure produces an electrical signal. The microphone system also includes a circuit for processing the signal. Two or more selectable amplifiers are coupled in a signal path between the movable structure and the circuit. Each of the selectable amplifiers is configured to attenuate the signal by a different amount. A selector is configured to select one of the selectable amplifiers, based on a selection signal.

The selectable amplifiers may include two or more series-connected capacitors coupled to a conductive line carrying the signal, so as to produce two or more signal paths. Each of the signal paths is configured to carry the signal attenuated by a different amount. Each of the signal paths is coupled to a different respective one of the selectable amplifiers. A control circuit is configured to activate the selector after the original signal meets a criterion or a signal derived from the original signal meets a criterion.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
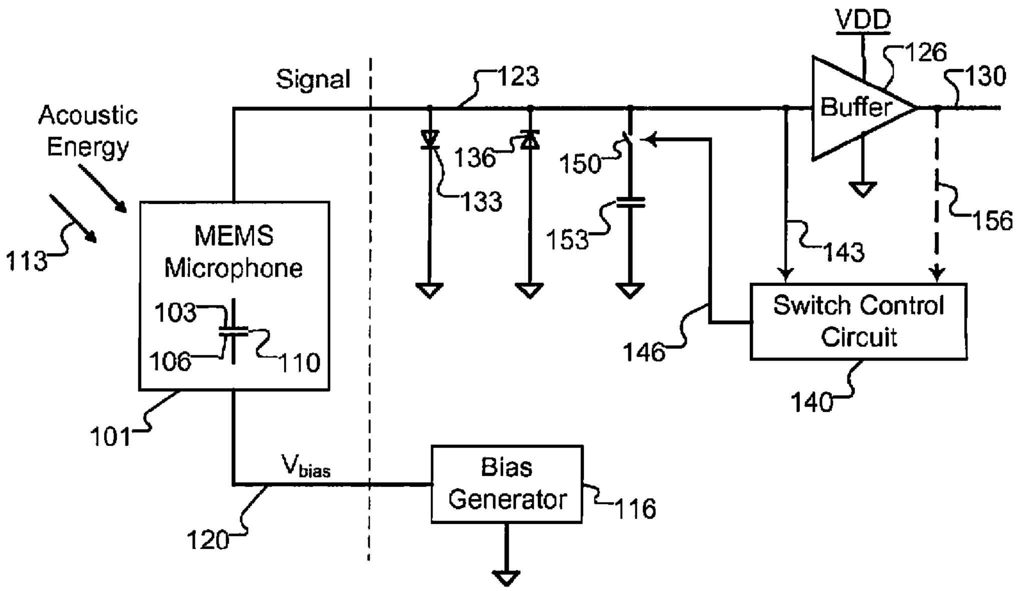
FIG. 1 is a schematic diagram of a circuit for automatically attenuating a signal from a MEMS microphone in response to the signal meeting a criterion, according to an embodiment of the present invention.

In accordance with embodiments of the present invention, methods and apparatus are disclosed for automatically attenuating a signal from a MEMS or other capacitor microphone in response to the signal meeting a criterion, such as if the signal is clipped or the amplitude of the signal exceeds a predetermined threshold value. Thus, distortion or other problems caused by clipping can be avoided or reduced.

According to conventional design practices, capacitances should be minimized along a signal line from a microphone to a circuit that processes the signals. For example, the length of this signal line is typically kept as short as practical to avoid parasitic capacitances between the signal line and other conductors. However, contrary to conventional design practices, embodiments of the present invention intentionally selectively connect a capacitance to a line carrying a signal from a microphone to a circuit that processes the signal, so as to attenuate the signal before it is processed by the circuit.

In one embodiment, a switch control circuit monitors a signal produced by the microphone or a signal derived from the voltage signal and controls one or more switches in response to attributes of the monitored signal. The switches are connected to the signal line and to one or more capacitors, such that the amount of capacitance connected to the line depends on the states of the switches.

When a criterion is met, for example when the amplitude of the monitored signal exceeds a threshold, or the monitored signal has been clipped or analysis of the monitored signal indicates clipping is imminent or likely, the switch control circuit operates the switches so as to selectively connect one or more of the capacitors to the signal line, i.e., so as to connect a selected capacitance to the signal line. Connecting the capacitance to the signal line attenuates the signal, thereby avoiding or reducing the clipping.

After the capacitance has been connected to the signal line, if the criterion continues to be met, or if the criterion is subsequently again met, the switches may be further operated to connect additional capacitance to the signal line. As the amplitude of the monitored signal or the likelihood of clipping diminishes or ceases, the switch control circuit may operate the switches to reduce (possibly to zero) the capacitance connected to the signal line. Thus, capacitance may be dynamically added or removed in steps in response to changes in the attributes of the signal.

The switches may be implemented with metal oxide semiconductor field effect transistors (MOSMETs), MEMS switches or any other suitable switches or circuits. The switches may be co-located with the microphone in a common semiconductor package. The switches may be fabricated on the same die as the microphone or on another die within the same package, such as a die that includes an ASIC or other circuit that processes the signals from the microphone. Similarly, the capacitors may be co-located with the microphone in a common semiconductor package, and the capacitors may be fabricated on, or attached to, the microphone die or another die, such as the die that includes the circuit that processes the microphone signals. The switch control circuit may be co-packaged with the microphone on the microphone die or another die, or the switch control circuit may be partially or completely external to the package.

A semiconductor package includes a casing, typically made of plastic, ceramic or metal, inside which one or more dies are disposed. The die(s) is(are) attached to a substrate of the package. The package includes one or more electric leads, pads or other electrically conductive features, by which the package can be electrically connected to a circuit board, such as a printed circuit board. The package provides mechanical and, in some cases, environmental protection to the die(s). In the case of a MEMS microphone, the casing may include an aperture, through which acoustic signals may pass. Nonlimiting exemplary package types include ball-grid array (BGA), surface mount and through-hole.

FIG. 1 is a schematic circuit diagram of an embodiment of the present invention. A MEMS microphone 101 includes a conductive micromachined diaphragm 103 parallel to, and separated from, a fixed conductive plate 106 that collectively form a capacitor 110, as is well known in the art. Acoustic energy 113, such as from a user speaking into the MEMS microphone 101, causes the diaphragm 103 to vibrate, which causes the capacitance of the capacitor 110 to vary. A bias generator 116 applies a bias voltage $V_{bias}$ 120 to the capacitor 110. To facilitate placing the bias voltage across the capacitor 110, the signal side 103 of the capacitor 110 is connected to ground via a high-impedance path provided by anti-parallel diodes 133 and 136 and any necessary resistors or other components, etc. (not shown).

Because charge (q) on the capacitor 110 remains essentially constant as the diaphragm vibrates, and the capacitance (C) of the capacitor 110 varies with the vibrations, a voltage (V) across the capacitor 110 varies according to equation (1).

$$V=q/C \quad (1)$$

The varying voltage across the capacitor 110 provides a signal 123 that may be processed by another circuit, such as an amplifier or an analog-to-digital converter. In the embodiment shown in FIG. 1, the processing circuit is a buffer 126; however other types of circuits, such as ASICS and analog-to-digital converters, may be used. The buffer 126 generates an output signal 130 that may be used to drive subsequent circuits (not shown).

As noted, the diaphragm 103 of the MEMS microphone 101 may reach its absolute displacement limit, resulting in clipping of the signal 123. Even if the diaphragm 103 does not reach its absolute displacement limit, an ASIC or other processing circuitry may not be able to handle the peaks of the electrical signal from the MEMS microphone 101, and the signal may be clipped by the ASIC or other circuit, particularly if a sensitive MEMS microphone is used or if the supply voltage VDD to the ASIC is small. Furthermore, the diodes 133 and 136 become forward biased and begin conducting signal to ground when the instantaneous signal reaches about 600 mV, thereby clipping the signal, as exemplified at 201 and 203 in the waveform 206 of the signal 123 shown in FIG. 2. As noted, clipping is undesirable.

Returning to FIG. 1, a switch control circuit 140 is coupled via a line 143 to receive the signal 123 produced by the MEMS microphone 101. The switch control circuit 140 analyzes the signal 123 to determine if the signal 123 meets a criterion, such as whether the signal 123 is being clipped or clipping of the signal 123 or a subsequent signal is imminent or likely. If the switch control circuit 140 determines that the criterion is met, the switch control circuit 140 generates a control signal 146 to activate a switch 150, which connects a capacitance 153 to the signal line 123. The capacitance 153 may be provided by one or more capacitors, the switch 150 may include a plurality of individual switches and the control signal 146 may include individual signals to control the individual switches, as described in more detail below. The added capacitance 153 reduces the amplitude of the signal 123 (as per equation (1), above), thereby preventing or reducing the clipping. Operation and structure of the switch control circuit 140 are described in more detail below.

If $C_{MEMS}$ represents the capacitance of the MEMS microphone 101, and $C_A$ represents the capacitance 153, the attenuation of the signal 123 depends on the ratio shown in equation (2).

$$C_{MEMS}/(C_A+C_{MEMS}) \quad (2)$$

A typical MEMS microphone may have a capacitance of about 500 femtofarads (fF), unless of course the diaphragm reaches its absolute displacement limit and shorts to the fixed conductive plate. A capacitance 153 of about 500 femtofarads would attenuate the signal 123 from the MEMS microphone 101 by about 6 db. Capacitances in a range of about $C_{MEMS}$ to about nines times $C_{MEMS}$ may be used to provide attenuations in a range of about 6-20 db in one or more steps.

Figure 2:
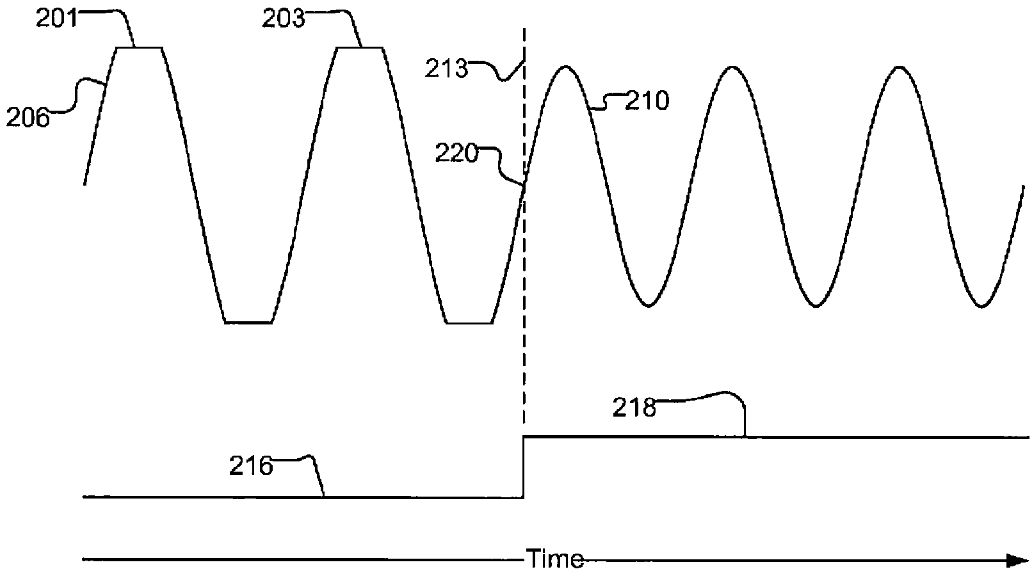
FIG. 2 shows waveforms of clipped and attenuated signals as a result of using an embodiment of the present invention.

A reduced-amplitude signal produced after the capacitance 153 has been connected to the signal line 123 is shown in a portion 210 of the waveform shown in FIG. 2. A dashed line 213 indicates a time at which the switch 150 is activated. The lower waveform in FIG. 2 represents the control signal 146 generated by the switch control circuit 140 to control the switch 150. As illustrated, during a first portion 216 of the lower waveform, the control signal 146 is "low" or "off" and does not activate the switch 150, whereas during a second portion 218 of the waveform, the control signal 146 is "high" or "on" and activates the switch 150. In one embodiment, the control signal 146 is generated such that the switch 150 is activated at a zero-crossing 220 in the signal 123 from the MEMS microphone 101, i.e., when the signal 123 reaches its DC value.

Figure 3:
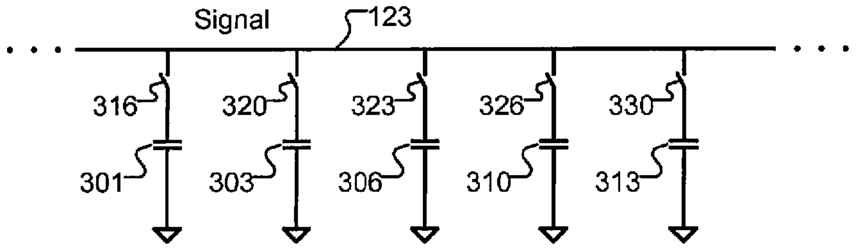
FIG. 3 is a schematic circuit diagram of switched capacitors, according to an embodiment of the present invention.

As noted, the capacitance 153 (FIG. 1) may be provided by one or more capacitors. FIG. 3 is a schematic circuit diagram of one embodiment of a portion of the schematic circuit diagram of FIG. 1. FIG. 3 illustrates a plurality of capacitors 301, 303, 306, 310 and 313, each capacitor 301-313 connected via a respective switch 316, 320, 323, 326 and 330 to the signal line 123. The capacitance connected to the signal line 123 depends on the states of the switches 316-330. Each capacitor 301-313 may have a different capacitance value. For example, the capacitor values may be binary weighted, i.e., each capacitor may have a value that is about double the capacitance of the capacitor to its right. Of course, each capacitor 301-313 shown in FIG. 3 may be implemented with one or more physical capacitors connected in parallel and/or series.

Figure 4:
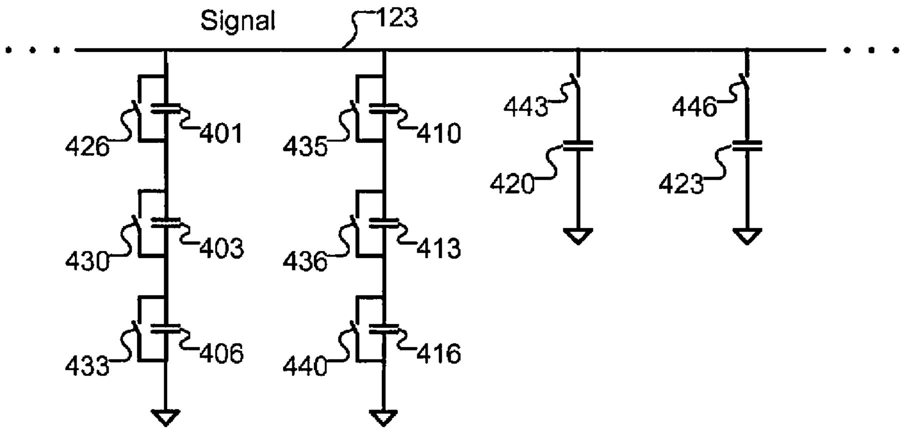
FIG. 4 is a schematic circuit diagram of switched capacitors, according to another embodiment of the present invention.

All the capacitors need not be effectively connected in parallel. As shown in FIG. 4, some or all of the capacitors 401-416 may be connected in series. Optionally or additionally, some of the capacitors 401-416 may be connected in series, and other of the capacitors 420 and 423 may be connected in parallel. FIG. 4 shows one configuration of switches 426-446; however, other switch configurations may be used, as long as the states of the switches 426-446 determine the amount of capacitance connected to the signal line 123.

Returning to FIG. 1, in some embodiments, the switch control circuit 140 may analyze a different signal, such as the output of the buffer 126 (as indicated by a dashed line 156) or a signal available at an input or an output of some subsequent component or circuit (not shown), including a component or circuit that is not within the same integrated circuit package as the microphone 101. The analyzed signal may be an analog or a digital signal.

Figure 5:
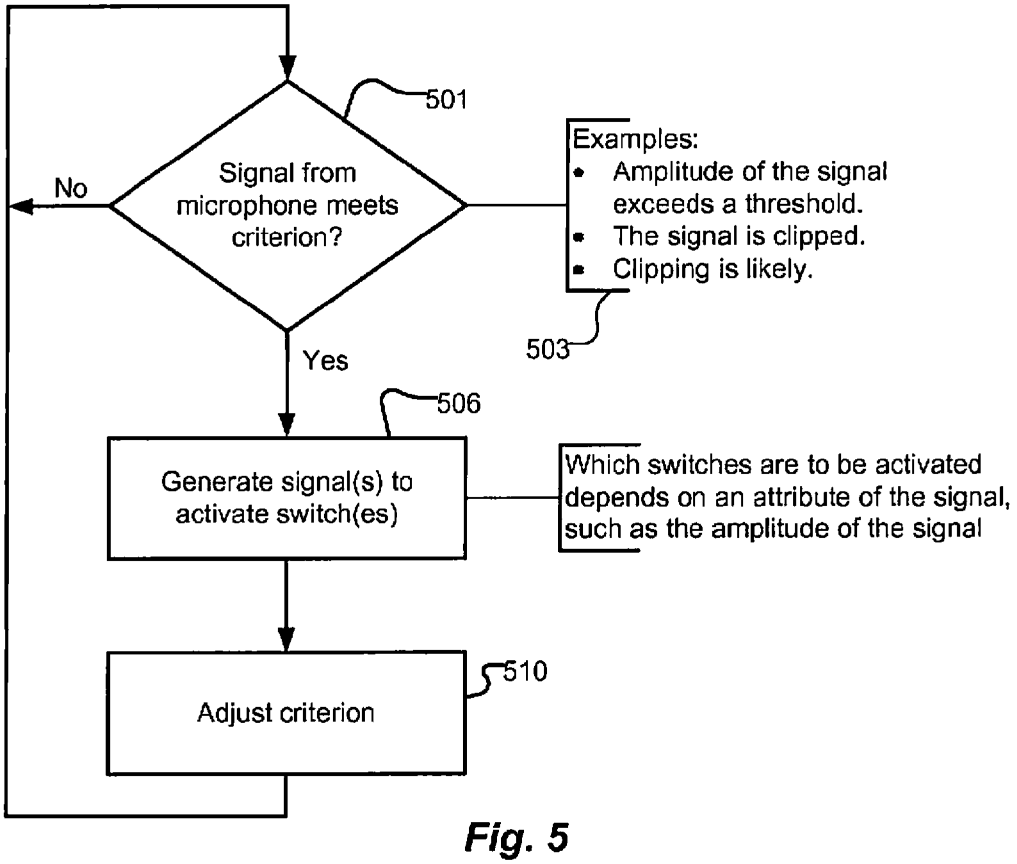
FIG. 5 is a flow diagram illustrating operation of an embodiment of the present invention.

FIG. 5 contains a flow diagram summarizing operation of some embodiments of the present invention. At 501, a signal from a microphone is analyzed to determine whether the signal meets a criterion. As noted, the analyzed signal may come directly from the microphone or from another portion of the circuit. As indicated in the examples 503, the criterion may involve: whether the amplitude of the signal exceeds a predetermined or a dynamically determined threshold; whether clipping of the signal has already occurred (optionally, for a threshold amount of time); whether clipping is likely or imminent (for example, whether the amplitude is rapidly increasing or approaching a value at which clipping would occur); or some other criterion or combination of criteria (collectively herein referred to as a "criterion").

Various aspects of a signal may be considered in determining if the signal exceeds a threshold value. For example, instantaneous or average amplitude of the signal may be compared to a fixed or variable threshold value. Optionally or alternatively, the average may be a root mean square (RMS) value, an average of peak amplitudes of the signal envelope or any other suitable function. Criteria used in conventional automatic gain control (AGC) and other well-known systems for determining when and to what extent a signal should be attenuated, and when and to what extent the attenuation should be removed, may be used. Additional descriptions of criteria that may be used for determining if or when the signal should be attenuated, as well as additional description that may be relevant to other portions of the present invention, are described in U.S. Provisional Patent Application Nos. 61/186,056, titled "High Level Capable Audio Amplification System" filed Jun. 11, 2009 by Henrik Thomsen, et al.; 61/243,221,and 61/243,240, the entire contents of each of which is hereby incorporated by reference herein, for all purposes. If the criterion is not met, control returns to 501, where the signal analysis and criterion determination are performed again.

If the criterion is met, at 506 signals are generated to activate one or more switches, so as to connect a selected capacitance to the signal line from the microphone. The amount of capacitance selected to be connected to the signal line may depend on various factors, such as: the amplitude of the analyzed signal; the rate of change of the amplitude of the analyzed signal; the amount of capacitance (if any) recently connected to the signal line; the difference between the current amplitude of the analyzed signal and the amplitude at which the signal would be clipped (i.e., the amount of remaining "headroom"); or the length of time since the last change was made in the amount of capacitance connected to the signal line.

Optionally, at 510, the criterion may be adjusted. For example, once one or more switches have been activated to connect capacitance to the signal line, the criterion may be changed, such that the threshold that must be exceeded to trigger connecting additional capacitance may be reduced, for example, from about 75% to about 25% of the amplitude at which the onset of clipping would occur.

Figure 6:
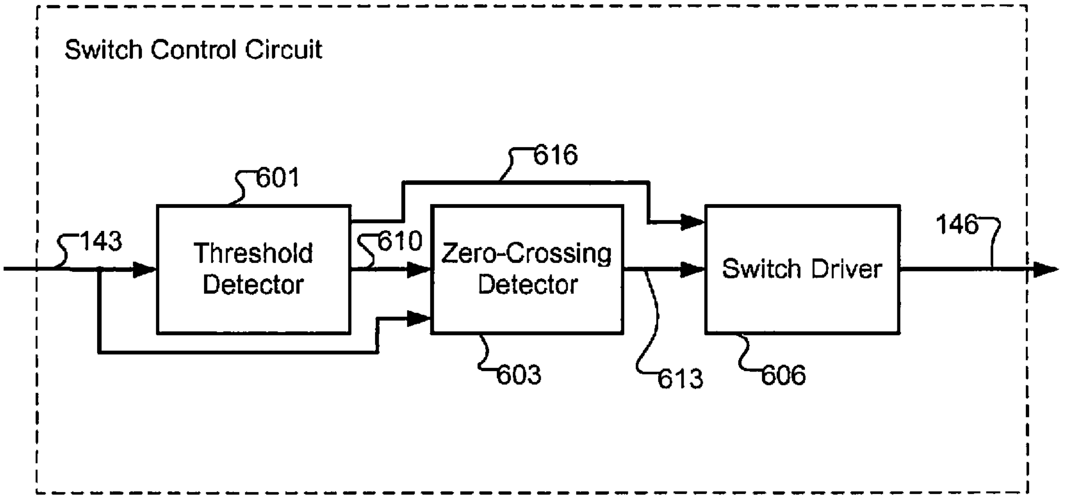
FIG. 6 is a schematic block diagram of a switch control circuit of FIG. 1, according to an embodiment of the present invention.

FIG. 6 is a schematic block diagram of a switch control circuit, according to one embodiment of the present invention. As noted, the switch control circuit analyzes a signal 143 from the MEMS microphone 101, another microphone (not shown) or a signal 156 from the buffer or from another component or circuit. For simplicity of explanation, FIG. 6 refers to the signal 143 from the MEMS microphone 101. Also as noted, the switch control circuit generates a control signal 146 to control operation of the switch(es) 150.

The switch control circuit of FIG. 6 includes a threshold detector 601, a zero-crossing detector 603 and a switch driver circuit 606. If the analyzed signal 143 exceeds a predetermined threshold amplitude, such as about 75% of the amplitude at which the onset of clipping would occur, the threshold detector 601 generates a trigger signal 610. Optionally, the trigger signal 610 is not generated unless the criterion has been met for a threshold amount of time, such as on the order of 10 s or 100 s of milliseconds. In other embodiments, other criteria may be used to determine if and when the trigger signal 610 is generated.

The trigger signal 610 from the threshold detector 601 triggers the zero-crossing detector 603. The analyzed signal 143 is also provided to the zero-crossing detector 603. Once triggered, the zero-crossing detector 603 generates a second trigger signal 613 when the analyzed signal 143 crosses its DC value.

The second trigger signal 613 triggers the switch driver 606. The threshold detector 601 also generates a magnitude signal 616 for indicating an amount by which the amplitude of the analyzed signal 143 exceeds the threshold value or another indication of the magnitude of the need to attenuate the signal. This magnitude signal 616 is provided to the switch driver 606. Once triggered by the second trigger signal 613, the switch driver 606 uses the magnitude signal 616 to select a combination of switch(es) 150 to activate, such as based on the factors described above, and the switch driver 606 generates a the control signal 146 to activate the selected switch(es) 150.

The switch(es) 150 connect(s) the capacitance 153 to the signal line 123, thereby commencing attenuation of the signal 123. The amount of attenuation depends on the amount of capacitance connected to the signal line 123. Commencing the attenuation at a zero-crossing has been found to produce a more pleasing result and/or to cause fewer audible artifacts than connecting the capacitance 153 at other phases of the signal 123.

The switch control circuit may be implemented with analog circuits or combinatorial logic, by a processor (such as a digital signal processor (DSP)) executing instructions stored in a memory or by any other appropriate circuit or combination.

Once the analyzed signal 143 no longer meets the criterion, the switch control circuit may remove some or all of the capacitance 153 that has been connected to the signal line 123 using the same or similar logic and/or circuits as described above for adding the capacitance 153 to the line 123. The switch control circuit may introduce a delay before removing the capacitance 153 to avoid or reduce the likelihood of repeatedly cycling its operation. Furthermore, the same or a different criterion may be used to determine when, i.e., in response to what signal attributes, and to what extent to remove or reduce the capacitance. Thus, capacitance may be added and removed in equal or unequal steps and in response to the signal meeting symmetric or asymmetric criteria.

Embodiments of the present invention may be used with various types of capacitor microphones, including MEMS microphones, electret condenser microphones (ECMs), etc.

As noted in the discussion above, with respect to FIG. 1 and Equation (2), the attenuation of the signal 123 depends on the ratio $C_{MEMS}/(C_A+C_{MEMS})$. However, $C_{MEMS}$ and $C_A$ may be fabricated on different substrates, possibly using different fabrication techniques or different kinds of semiconductor materials. Thus, the values of $C_{MEMS}$ and $C_A$ may not track. That is, the value of $C_{MEMS}$ may vary independently of the value of $C_A$. For example, $C_{MEMS}$ and $C_A$ may vary according to different processes used to manufacture the dies on which the MEMS microphone and $C_A$ reside. Consequently, the attenuation caused by a given capacitance 153 applied to the signal 123 may vary with manufacturing lot.

Figure 7:
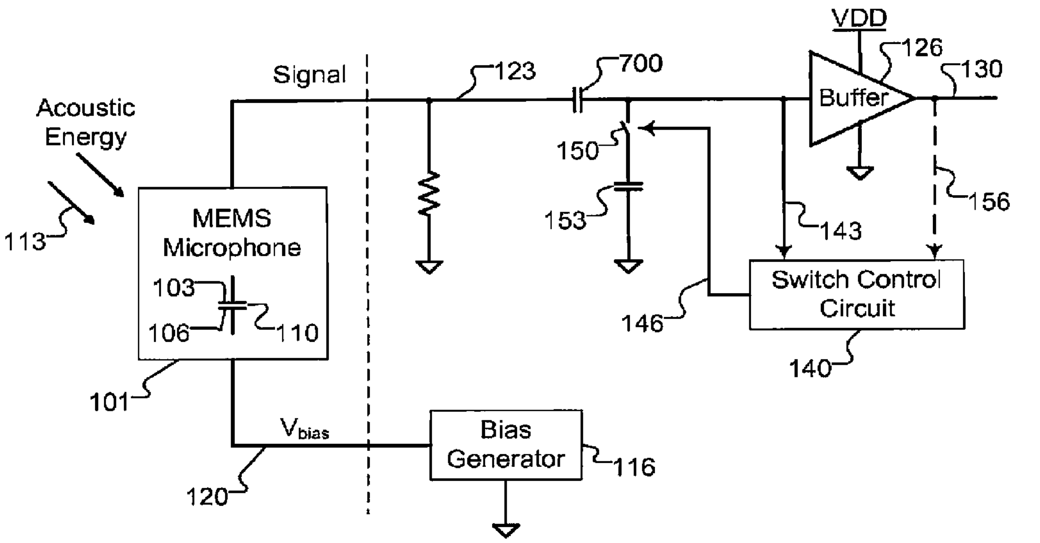
FIG. 7 is a schematic diagram of a circuit for automatically attenuating a signal from a MEMS microphone in response to the signal meeting a criterion, in accordance with another embodiment of the present invention.

FIG. 7 is a schematic circuit diagram of another embodiment of the present invention, similar to the circuit of FIG. 1. An AC coupling capacitor 700 is connected in series between the MEMS microphone 101 and the attenuation capacitance 153. Such an AC coupling capacitor can reduce the degree to which the attenuation depends on $C_{MEMS}$. If $C_I$ represents the capacitance 700, the signal 123 is attenuated by a factor given by equation (3).

$$(C_{MEMS}*C_I)/(C_A*C_I+C_{MEMS}*C_A+C_{MEMS}*C_I) \quad (3)$$

Where $C_I \ll C_{MEMS}$, the attenuation can be approximated by equation (4), which is essentially independent of $C_{MEMS}$ $$C_I/(C_A+C_I) \tag{4}$$

Where $C_I \gg C_{MEMS}$, the attenuation can be approximated by equation (5).

$$C_{MEMS}/(C_A+C_{MEMS}) \tag{5}$$

Even where the capacitance of the MEMS microphone 101 cannot be totally ignored, the attenuation depends less on the value of $C_{MEMS}$ than it does in a circuit without an AC coupling capacitor 700.

The AC coupling capacitor 700 can also reduce total harmonic distortion (THD) of the signal 123, when the attenuation capacitance 153 is connected to the signal circuit. The THD depends on the parasitic load applied to the MEMS microphone 101. Without an AC coupling capacitor 700, the parasitic load is $C_A$. A $C_A$ value that is several times the value of $C_{MEMS}$ can cause significant distortion.

On the other hand, with the AC coupling capacitor 700 in the circuit, the parasitic load applied to the MEMS microphone 101 is $C_I$ in series with $C_A$. If $C_I$ is approximately equal to $C_{MEMS}$, and $C_A$ is approximately ten times the value of $C_{MEMS}$, the series combination of $C_A$ and $C_I$ is approximately equal to $C_I$. Since $C_I$ is approximately one-tenth the value of $C_A$, the series circuit causes much less THD degradation than if $C_I$ were absent.

Figure 8:
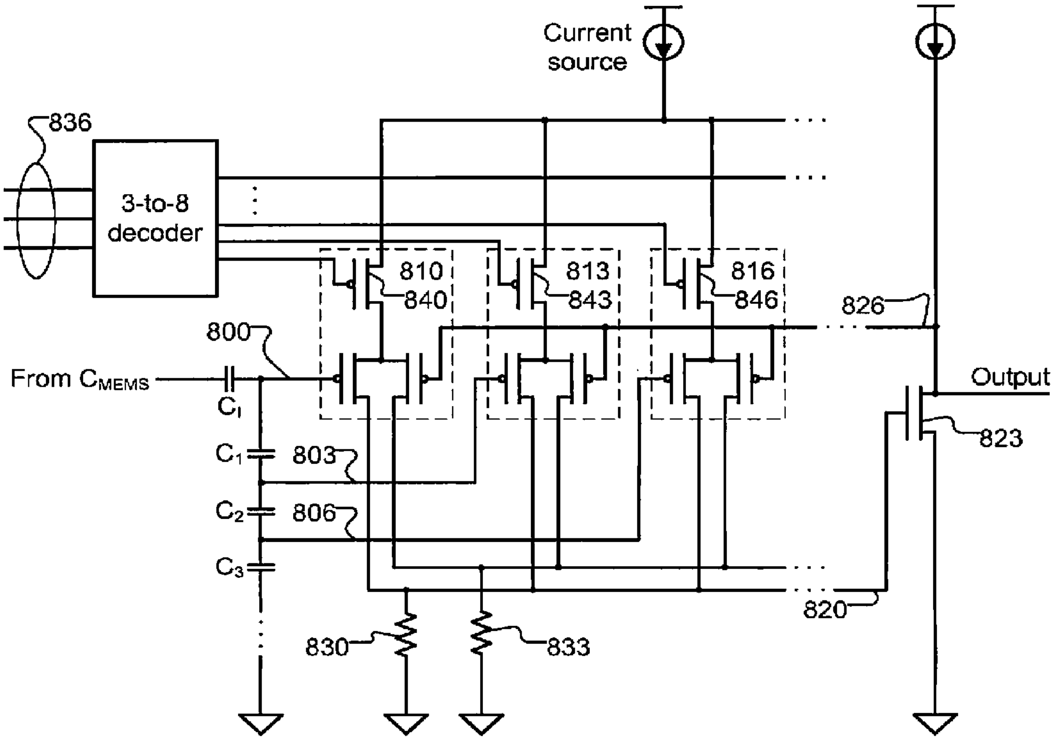
FIG. 8 is a schematic diagram of a circuit for automatically attenuating a signal from a MEMS microphone in response to the signal meeting a criterion, in accordance with yet another embodiment of the present invention.

FIG. 8 is a schematic circuit diagram of another embodiment of the present invention, in which capacitances that provide selective attenuation of a signal are not individually switched into, or out of, the circuit. Instead, capacitors $C_1$, $C_2$, $C_3$, etc. provide signals 800, 803, 806, etc. with progressively greater attenuations. Each of the attenuated signals 800, 803, 806, etc. is applied to a respective selectable differential input stage 810, 813, 816, etc. of an amplifier. Respective outputs of the differential input stages 810, 813, 816, etc. are connected together to create an intermediate output 820, which is connected to a common output stage 823. The output stage 823 and the selected differential input stage collectively form the amplifier, which provides a signal with a selected attenuation. Thus, each selectable input stage 810, 813, 816, etc. and the output stage 823 form a respective selectable amplifier, although the output stage is common among all the selectable amplifiers. In some other embodiments, each selectable amplifier may have its own output stage and may, but need not, share one or more components with other selectable amplifiers.

The differential input stages 810, 813, 816, etc. and the output stage 823 are configured with feedback 826, so the resulting amplifier has unity gain. DC bias circuits (not shown for simplicity) may be included, as necessary. Resistors 830 and 833 may, of course, be replaced by current minors.

The amount of attenuation provided by the circuit depends on which differential input stage 810, 813, 816, etc. is selected. The embodiment shown in FIG. 8 may include eight attenuation capacitors $C_1$, $C_2$, $C_3$, etc. and eight differential input stages 810, 813, 816, etc. An attenuation selection signal 826 may be a three-bit binary encoded value attenuation select signal (similar to the control signal 146 discussed above, with respect to FIG. 1) to select one of differential input stages 810, 813, 816, etc. and, therefore, one of the eight possible attenuations. The attenuation selection signal 830 may be generated based on the Output signal or a signal derived from the Output signal, similar to the way the control signal 146 is generated, as discussed above with respect to FIGS. 5 and 6. Selecting one of the differential input stages 810, 813, 816 involves enabling the selected stage's respective switch 830, 833 or 836, etc. Other numbers of attenuation capacitors and differential input stages may, of course, be used with appropriate attenuation selection signals.

In general, $C_1<C_2<C_3$, etc., and the attenuation of signal 800 is less than the attenuation of signal 803, which is less than the attenuation of signal 806, etc. However, as noted above, the actual attenuation depends on the relative values of $C_{MEMS}$, $C_I$ (if included) and the one or more capacitors ($C_1$, $C_2$, $C_3$, etc.) in series feeding a given differential input stage 810, 813, 816, etc. As noted above, $C_I$ may be omitted. It should be noted that the attenuations associated with the lower numbered differential input stages depend on fewer of the capacitors $C_1$, $C_2$, $C_3$, etc. (and specifically the lower numbered capacitors) than the higher numbered differential input stages. For example, assuming $C_1 \ll C_2$, the value of $C_2$, $C_3$, etc. have little impact on the attenuation of the first signal 800. In addition, the smaller the value of $C_1$, relative to the values of $C_I$ and $C_{MEMS}$, the closer the ratio of the attenuation of the signal 800 to the attenuation of the signal 803 is to that shown in equation (6), and the more independent these attenuations are to the value of $C_{MEMS}$.

$$C_1/(C_2+C_1) \tag{6}$$

Figure 9:
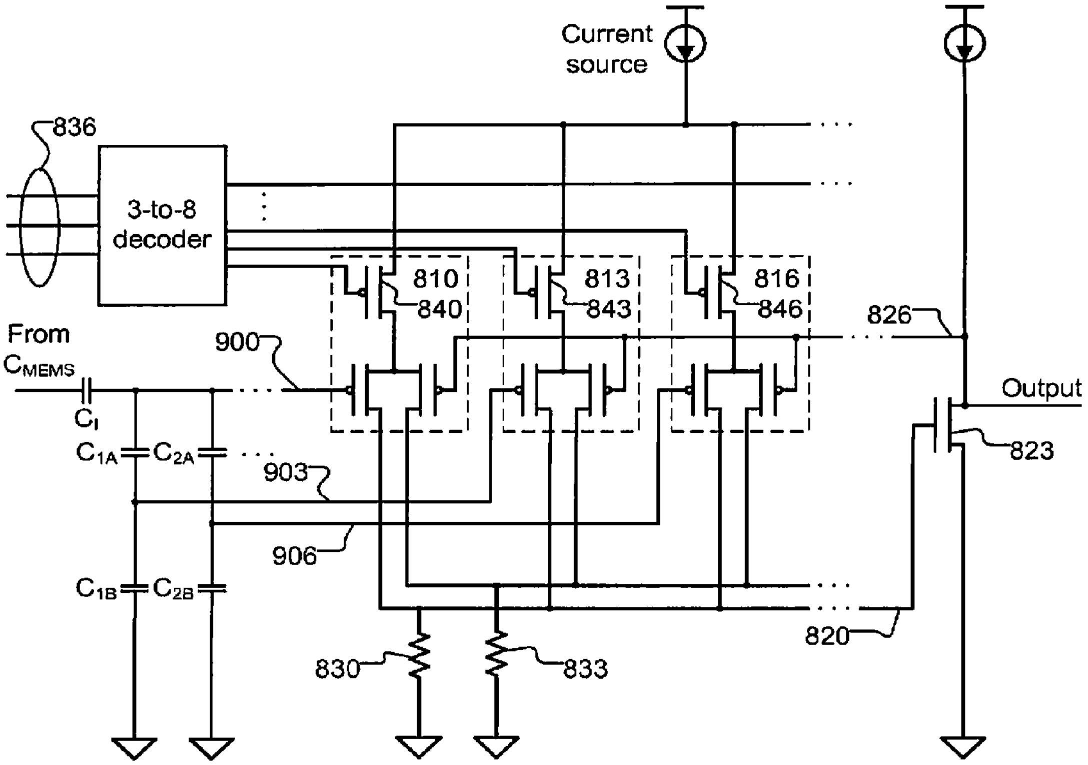
FIG. 9 is a schematic diagram of a circuit for automatically attenuating a signal from a MEMS microphone in response to the signal meeting a criterion, in accordance with another embodiment of the present invention.

FIG. 9 is a schematic circuit diagram of another embodiment of the present invention. The circuit of FIG. 9 is similar to the circuit of FIG. 8, except the signals 900, 903, 906, etc. having progressively greater attenuations are provided by a set of capacitor pairs $C_{1A}$, $C_{1B}$, $C_{2A}$, $C_{2B}$, etc. Each capacitor pair, such as capacitors $C_{1A}$ and $C_{1B}$, act as a signal divider. All the $C_{XB}$ capacitors may have identical values, and the $C_{XA}$ capacitors can have progressively smaller values. For example, the value of $C_{2A}$ may be ten times smaller than the value of $C_{1A}$.

Figure 10:
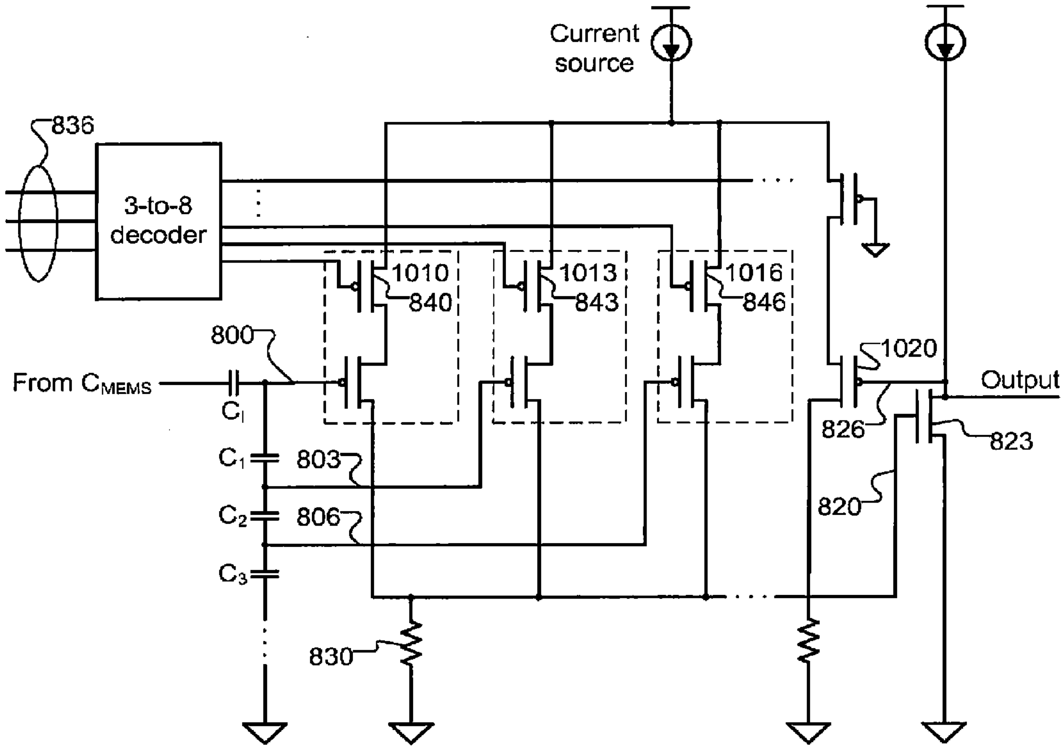
FIG. 10 is a schematic diagram of a circuit for automatically attenuating a signal from a MEMS microphone in response to the signal meeting a criterion, in accordance with yet another embodiment of the present invention.

FIG. 10 is a schematic circuit diagram of yet another embodiment of the present invention. The circuit of FIG. 10 is similar to the circuit of FIG. 8, except each selectable input stage 1010, 1013, 1016, etc. includes only the non-inverting half of the differential circuit shown in FIG. 8. All the non-inverting selectable input states 1010, 1013, 1016, etc. share a common inverting half 1020.

A switch control circuit has been described as including a processor controlled by instructions stored in a memory. The memory may be random access memory (RAM), read-only memory (ROM), flash memory or any other memory, or combination thereof, suitable for storing control software or other instructions and data. Some of the functions performed by the methods and apparatus for automatically attenuating a signal from a microphone in response to the signal meeting a criterion have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of an embodiment of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of methods and apparatus have been described with reference to a flowchart, those skilled in the art should readily appreciate that functions, operations, decisions, etc. of all or a portion of each block, or a combination of blocks, of the flowchart may be combined, separated into separate operations or performed in other orders. Furthermore, disclosed aspects, or portions of these aspects, may be combined in ways not listed above. Accordingly, the invention should not be viewed as being limited to the disclosed embodiments.

What is claimed is:

1. A microphone system comprising:

a movable structure movable in response to an acoustic signal establishing a variable MEMS capacitance with respect to an electrode, the movable structure and the electrode forming a MEMS microphone, the movement of the movable structure causing a signal to be generated, the signal being carried on a conductive line;

a circuit configured to process the signal;

a capacitor coupling the conductive line to ground upon detection of the processed signal exceeding a criterion by the circuit; and a switch selectively operable to connect to the conductive line so as to attenuate the signal before the signal is processed by the circuit, wherein the capacitor has associated therewith a capacitance that in combination with the variable MEMS capacitance serves as a signal divider causing the signal on the conductive line to be attenuated.

2. The microphone system according to claim 1, wherein the capacitance comprises a capacitor connected between the switch and ground.

3. The microphone system according to claim 1, wherein:

the capacitance comprises a plurality of capacitors; and the switch comprises a plurality of switches connected to the plurality of capacitors, such that the capacitance connected to the line depends on the states of the switches.

4. The microphone system according to claim 3, wherein each of the capacitors in the plurality of capacitors has a different capacitance.

5. The microphone system according to claim 3, wherein each of the switches comprises a MOSFET switch.

6. The microphone system according to claim 3, wherein each of the switches comprises a MEMS switch.

7. The microphone system according to claim 1, further comprising a switch control circuit configured to activate the switch after at least one of the signal and a signal derived from the signal meets a criterion.

8. The microphone system according to claim 7, wherein the criterion is met when at least one of the signal and the signal derived from the signal exceeds a threshold value.

9. The microphone system according to claim 7, wherein the criterion is met when at least one of the signal and the signal derived from the signal is clipped.

10. The A microphone system according to claim 7, wherein the criterion is met when at least one of the signal and the signal derived from the signal reaches a value less than necessary for clipping.

11. The microphone system according to claim 7, wherein the movable structure, the switch and the switch control circuit are disposed within a common integrated circuit package.

12. The microphone system according to claim 11, wherein the movable structure and the switch are disposed in a common integrated circuit die.

13. The microphone system according to claim 11, wherein the movable structure and the switch are disposed in separate integrated circuit dies.

14. The microphone system according to claim 7, wherein:

the movable structure and the switch are disposed within a common integrated circuit package; and the switch control circuit is not disposed within the common integrated circuit package.

15. The microphone system according to claim 7, wherein the switch control circuit is configured to activate the switch in timed relation to a zero crossing of at least one of the signal and the signal derived from the signal.

16. The microphone system according to claim 1, further comprising a second capacitance connected in series between the variable capacitance and the capacitance.

17. A method for automatically attenuating a signal from a capacitor microphone by the microphone system of the claim 1 rejection, the method comprising:

automatically detecting amplitude of at least one of a signal from the capacitor microphone, and a signal derived from the capacitor microphone meeting a criterion;

in response to detecting the amplitude meeting the criterion, automatically connecting a capacitance to a line carrying a signal from the capacitor microphone.

18. The method according to claim 17, wherein connecting the capacitance to the line comprises activating a switch.

19. The method according to claim 18, wherein the switch is disposed within an integrated circuit package that houses the capacitor microphone.

20. The method according to claim 17, wherein:

a plurality of capacitors is selectively connectable to the line via a plurality of switches, such that the capacitance connected to the line depends on the states of the switches; and connecting the capacitance to the line comprises activating at least one of the plurality of switches, based on an attribute of the signal.

21. The method according to claim 20, wherein the attribute comprises amplitude of the signal.

22. The method according to claim 20, wherein the plurality of switches and the plurality of capacitors are disposed within an integrated circuit package that houses the capacitor microphone.

23. The method according to claim 17, wherein the criterion is met when the amplitude of the signal from the capacitor microphone exceeds a threshold.

24. The method according to claim 17, wherein the criterion is met when at least one of the signal from the capacitor microphone and the signal derived from the capacitor microphone is clipped.

25. The method according to claim 17, wherein the criterion is met when the at least one of the signal from the capacitor microphone and the signal derived from the capacitor microphone reaches a value less than necessary for clipping.

26. The method according to claim 17, wherein a second capacitance is connected in series between the capacitor microphone and the capacitance.

27. A MEMS microphone system comprising:

a capacitor switchably coupled to a MEMS microphone and having associated therewith a capacitance, the MEMS microphone having a capacitance associated therewith and operable to generate a signal representative of a movement within the MEMS microphone;

a switch activated by a control signal and operable to switch the coupling of the capacitor to the MEMS microphone, wherein upon activation of the switch, the capacitor is coupled to the MEMS microphone and upon deactivation of the switch, the capacitor is decoupled from the MEMS microphone; and a switch control circuit coupled to the switch through the control signal and operable to generate the control signal, the switch control circuit further operable to activate the switch upon meeting a criterion, wherein the coupling of the capacitor to the MEMS microphone forms a signal divider from the capacitance of the MEMS microphone and the capacitance of the capacitor thereby attenuating the signal to avoid clipping thereof.

28. The MEMS microphone system according to claim 27, wherein the capacitance comprises a capacitor connected between the switch and ground.

29. The microphone system according to claim 27, wherein:

the capacitance comprises a plurality of capacitors; and the switch comprises a plurality of switches connected to the plurality of capacitors, such that the capacitance connected to the line depends on the states of the switches.

30. The microphone system according to claim 29, wherein each of the capacitors in the plurality of capacitors has a different capacitance.

31. The microphone system according to claim 29, wherein each of the switches comprises a MOSFET switch.

32. The microphone system according to claim 29, wherein each of the switches comprises a MEMS switch.

33. The microphone system according to claim 27, further comprising a switch control circuit configured to activate the switch after at least one of the signal and a signal derived from the signal meets a criterion.

34. The microphone system according to claim 33, wherein the criterion is met when at least one of the signal and the signal derived from the signal exceeds a threshold value.

35. The microphone system according to claim 33, wherein the criterion is met when at least one of the signal and the signal derived from the signal is clipped.

36. The microphone system according to claim 33, wherein the criterion is met when at least one of the signal and the signal derived from the signal reaches a value less than necessary for clipping.

37. The microphone system according to claim 33, wherein the movable structure, the switch and the switch control circuit are disposed within a common integrated circuit package.

38. The microphone system according to claim 37, wherein the movable structure and the switch are disposed in a common integrated circuit die.

39. The microphone system according to claim 37, wherein the movable structure and the switch are disposed in separate integrated circuit dies.

40. The microphone system according to claim 33, wherein:

the movable structure and the switch are disposed within a common integrated circuit package; and the switch control circuit is not disposed within the common integrated circuit package.

41. The microphone system according to claim 33, wherein the switch control circuit is configured to activate the switch in timed relation to a zero crossing of at least one of the signal and the signal derived from the signal.

42. The microphone system according to claim 27, further comprising a second capacitance connected in series between the variable capacitance and the capacitance.

* * * * *